(12) United States Patent
Modglin

(10) Patent No.: US 6,920,714 B1
(45) Date of Patent: Jul. 26, 2005

(54) AUTOMATIC JIGGING DEVICE FOR A FISHING ROD

(76) Inventor: Herbert Modglin, 222 Vicki Lynn, Scott City, MO (US) 63780

(*) Notice: Subject to any disclaimer, the term of this patent is extended or adjusted under 35 U.S.C. 154(b) by 0 days.

(21) Appl. No.: 10/800,969

(22) Filed: Mar. 15, 2004

(51) Int. Cl.[7] .............................................. A01K 91/06
(52) U.S. Cl. ..................................................... 43/19.2
(58) Field of Search .................................. 43/19.2, 26.1

(56) References Cited

U.S. PATENT DOCUMENTS

| | | | | |
|---|---|---|---|---|
| 3,001,317 A | * | 9/1961 | Boughton | 43/19.2 |
| 3,031,790 A | * | 5/1962 | Duryea | 43/19.2 |
| 3,550,302 A | * | 12/1970 | Creviston et al. | 43/19.2 |
| 3,691,668 A | * | 9/1972 | Strebig | 43/19.2 |
| 3,789,534 A | * | 2/1974 | Yankaitis | 43/19.2 |
| 3,839,810 A | * | 10/1974 | Lagasse | 43/19.2 |
| 4,020,582 A | | 5/1977 | Thelen | 43/19.2 |
| 4,280,295 A | | 7/1981 | Hoeving et al. | 43/19.2 |
| 4,420,900 A | * | 12/1983 | Nestor | 43/19.2 |
| 4,528,767 A | | 7/1985 | Smith, Jr. | 43/19.2 |
| 4,597,215 A | * | 7/1986 | Otremba | 43/19.2 |
| 4,660,317 A | * | 4/1987 | Evans | 43/19.2 |
| 4,680,885 A | * | 7/1987 | Lindell et al. | 43/19.2 |
| 4,700,501 A | * | 10/1987 | Bryan | 43/19.2 |
| 4,811,514 A | * | 3/1989 | Jordan | 43/19.2 |
| 4,821,448 A | * | 4/1989 | Lindaberry | 43/19.2 |
| 5,036,616 A | * | 8/1991 | Wilsey | 43/19.2 |
| 5,056,255 A | * | 10/1991 | Campbell | 43/19.2 |
| 5,201,884 A | * | 4/1993 | Nicholas | 43/26.1 |
| 5,437,121 A | * | 8/1995 | Chacon et al. | 43/19.2 |
| 6,009,656 A | * | 1/2000 | Knepp | 43/19.2 |
| 6,282,830 B1 | | 9/2001 | Henry | 43/19.2 |
| 6,588,137 B1 | | 7/2003 | Rozkowski | 43/17 |
| 6,634,134 B1 | * | 10/2003 | Nyquist | 43/19.2 |
| 6,779,291 B2 | * | 8/2004 | Arcand | 43/19.2 |

FOREIGN PATENT DOCUMENTS

FR    2608371 A1  *  6/1988

* cited by examiner

Primary Examiner—Darren W. Ark
(74) Attorney, Agent, or Firm—Hovey Williams LLP

(57) ABSTRACT

An automatic jigging device (10) that may be secured to a rod (16) of a fishing pole (12), thereby imparting action to a fishing lure, and broadly comprises an actuator (22) attached to the rod (16) and a controller (24) for controlling the actuator (22). The actuator (22) preferably includes a rotating assembly (28) for causing the vibration, a housing (32) for containing the assembly (28), and a rod mount (34) for securing the housing (32) to the rod (16). As a motor (30) rotates the assembly (28), the assembly's (28) offset center of gravity causes the actuator (22) to vibrate. The rod mount (34) preferably comprises one or more clips having an internal diameter approximating the rod's (16) external diameter. Thus, the actuator (22) may be firmly seated onto the rod (16), but not the handle (14), of the fishing pole (12), thereby leaving the handle (14) unobstructed.

9 Claims, 3 Drawing Sheets

AUTOMATIC JIGGING DEVICE FOR A FISHING ROD

BACKGROUND OF THE INVENTION

1. Field of the Invention

The present invention relates to fishing devices. More particularly, the present invention relates to an automatic jigging device that may be secured to a rod of a fishing pole, and thereby impart action to a fishing lure.

2. Description of Prior Art

Fishermen are more successful when their lure realistically imitates live bait and/or other things that may induce a fish to strike. As a result, not only do fishermen choose lures that look like live bait, but also want lures to imitate or move like live bait. In order to achieve this, some fishermen jerk their fishing poles in an effort to make their lures imitate live bait. However, such techniques may be difficult and beyond the skill of many fishermen. Additionally, such techniques may quickly fatigue many fishermen. Furthermore, such techniques require constant attention and repetitive motion, thereby reducing the recreational value of fishing.

In response, many devices have been developed that agitate fishing poles and/or lines for fishermen. However, prior art devices interfere with operation of the fishing pole to which they are attached. For example, many prior art devices mate with a handle of a fishing pole, and therefore interfere with a fisherman's grip and operation of the fishing pole. Alternatively, some prior art devices attach directly to a line of a fishing pole, and therefore interfere with reeling in the line.

In addition, prior art devices are often bulky, complex, and inefficient. For example, some prior art devices are rather large and must be permanently mounted to a fishing boat or other support. Additionally, some prior art devices include many moving parts. Of course, more energy is required to operate such complex devices, thereby making them inefficient.

Accordingly, there is a need for an improved automatic jigging device that overcomes the limitations of the prior art.

SUMMARY OF THE INVENTION

The present invention overcomes the above-identified problems and provides a distinct advance in the art of fishing devices. More particularly, the present invention provides an automatic jigging device that may be secured to a rod of a fishing pole, and thereby impart action to a fishing lure. The fishing pole is preferably conventional, and therefore preferably includes a handle to be gripped by a user and a rod extending from the handle. The lure is preferably secured to the fishing pole with a line controlled by a reel. Thus, the jigging device imparts vibration to the rod, which in turn imparts action to the lure through the line.

The jigging device broadly comprises an actuator attached to the rod, a controller for controlling the actuator, and a cable electrically coupling the actuator and the controller. The actuator preferably includes a rotating assembly for causing the vibration, an electric motor for rotating the rotating assembly, a substantially waterproof housing for containing the rotating assembly and the motor, and a rod mount for securing the housing to the rod. As the motor rotates the rotating assembly, the rotating assembly's offset center of gravity causes the actuator to vibrate.

In the preferred embodiment, the rod mount comprises one or more clips having an internal diameter approximating the rod's external diameter. Thus, the actuator may be firmly seated onto the rod, but not the handle, of the fishing pole. This ensures that the handle will remain unobstructed, thereby not interfering with the user's operation of the fishing pole. This also ensures that the fishing pole may be used with conventional fishing pole holders and the jigging device simultaneously.

The controller preferably include one or more controls to control the actuator, a power input through which electrical power is accepted to power the controls and the motor, and a housing through which the controls may be operated. The controls may include a power switch for selectively powering the motor, an intensity control for selecting a desired magnitude or intensity of the action imparted to the lure, a delay control for selecting a delay period during which less or no action is imparted to the lure, and a duration control for selecting a duration during which action is imparted to the lure after the delay period has elapsed.

For example, the user may wish that the lure alternate between wiggling for two seconds and remaining substantially still for three seconds. In this case, the user manipulates the intensity control until he or she obtains the desired intensity of the lure's wiggling, the duration control until the lure wiggles for approximately two seconds between the delay periods, and the delay control until the lure remains substantially still for three seconds between the durations during which the lure wiggles. Thus, the controls allow the user to ensure that the lure realistically imitates live bait and/or other things that may induce a fish to strike.

The power input preferably connects to an internal and/or external battery or another similarly convenient power source. Where the power input allows connection of both internal and external batteries, the power switch preferably allows the user to select between the internal and external batteries.

The housing of the controller may include a removable cover in order to allow access to the controller's internal components and/or allow the user to change the internal battery. The housing may also include a belt mount, such as a belt loop or a belt clip, to allow the user to secure the controller to his or her belt, thereby keeping the controls within the user's reach.

The cable may be sealed to the actuator and the controller using grommets, caulk, or any other commonly used sealing technique. The cable may also include a quick disconnect allowing the actuator to be physically and electrically separated from the controller. This allows the controller to be used with multiple actuators, which in turn, allows the actuator to be substantially permanently mounted to the fishing pole.

It can be seen that, through construction described herein, the actuator is minimized, both in terms of number of working parts and in other factors, such as size and weight. In this manner, interference with the user's operation of the fishing pole is minimized. This also increases the efficiency of the jigging device by minimizing the electrical power requirements of the motor. It can also be seen that the present invention does not directly contact the line, and therefore does not interfere with the user when he or she is trying to reel in the line.

In use, the user first connects the power source to the power input. The user then casts the lure as he or she normally would. The user then secures the actuator to the rod. At this point, the user may operate the controls and the fishing pole as desired.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
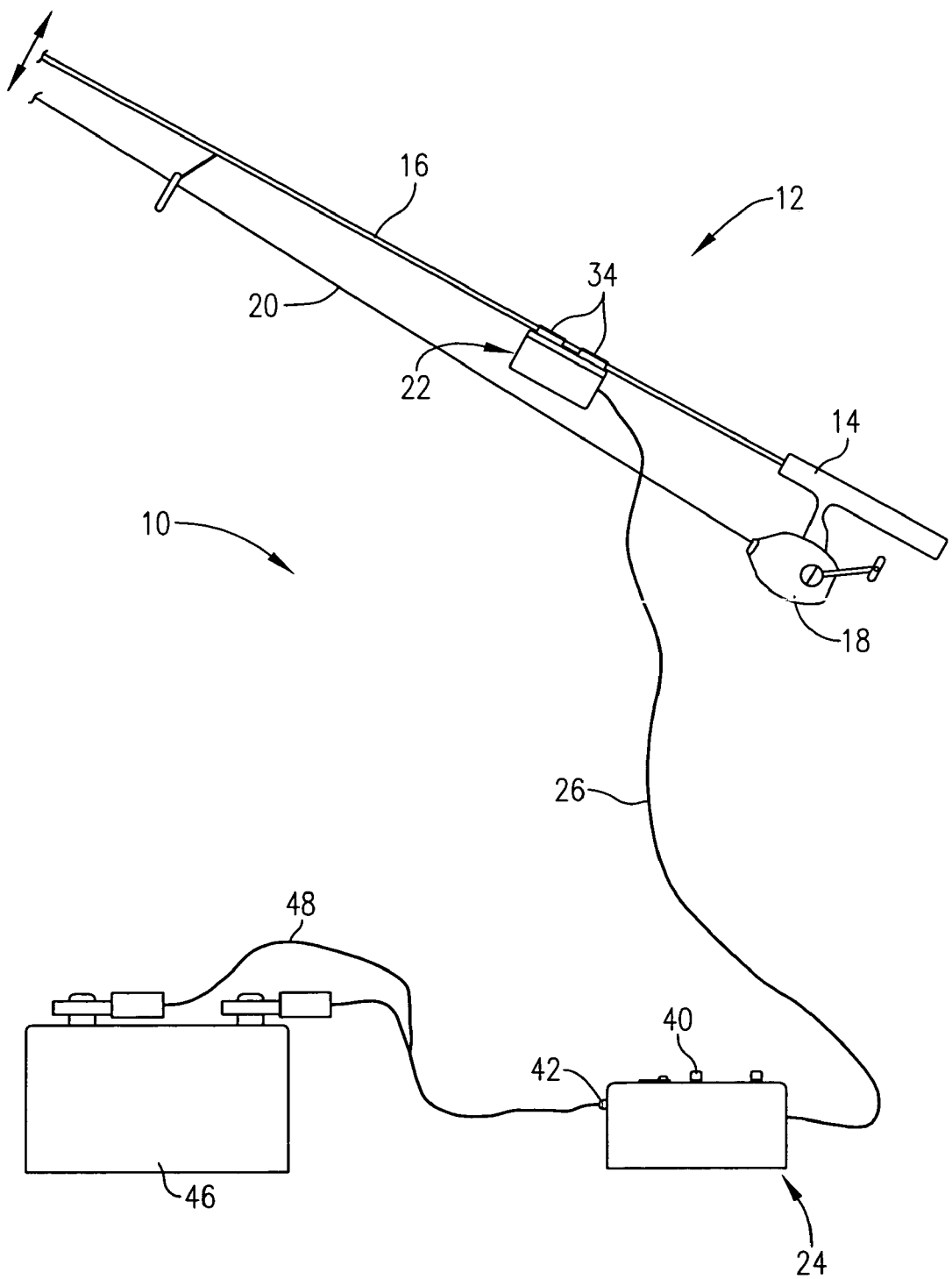
FIG. 1 is a perspective view of a jigging device constructed in accordance with a preferred embodiment of the present invention and shown secured to a fishing pole.

Referring to FIG. 1, the preferred jigging device 10 constructed in accordance with a preferred embodiment of the present invention is illustrated attached to a fishing pole 12 and designed to impart action to a fishing lure (not shown) secured to the fishing pole 12. The fishing pole 12 is preferably conventional, and therefore preferably includes a handle 14 to be gripped by a user and a rod 16 extending from the handle 14. The handle 14 may include, or be covered by, a gripping element designed to aid the user in gripping the handle 14. For example, many conventional fishing poles include a rubber, sponge, or cork covered handle. The handle 14 may also be inserted into a conventional fishing pole holder, such as those commonly found on fishing boats.

Since the handle 14 is typically designed to give the user positive control of the fishing pole 12 and the rod 16 is typically designed to flex, the rod 16 is typically much thinner than the handle 14. For example, the rod 16 is preferably less than one half inch in diameter. However, some heavy-duty fishing poles include relatively thick rods. Therefore, in some applications, the rod 16 may be greater than one half inch in diameter, but is preferably still thinner than the handle 14. The rod 16 is preferably flexible and may be constructed of any commonly used material, such as plastic, fiberglass, graphite, wood, or other natural materials.

The fishing pole 12 may also include a reel 18. The reel 18 may be of any conventional type, such as a casting-type reel or a spinning-type reel. In this case, the lure is preferably secured to the fishing pole 12 with a line 20 controlled by the reel 18. Alternatively, especially where the fishing pole 12 does not include the reel 18, the line 18 may simply be secured to a distal end of the rod 16. In either case, the jigging device 10 imparts vibration to the rod 16, which in turn imparts action to the lure through the line 20.

Figure 4:
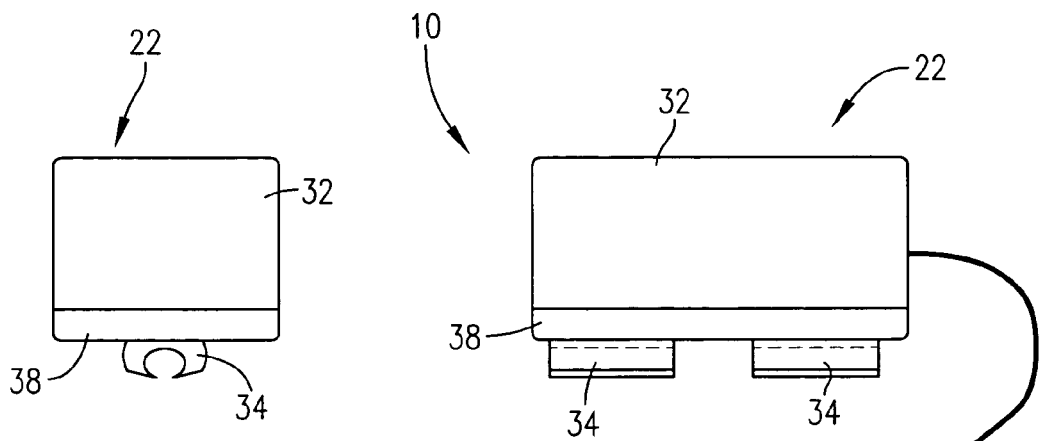
FIG. 4 is an elevation view of the jigger.
Figure 2:
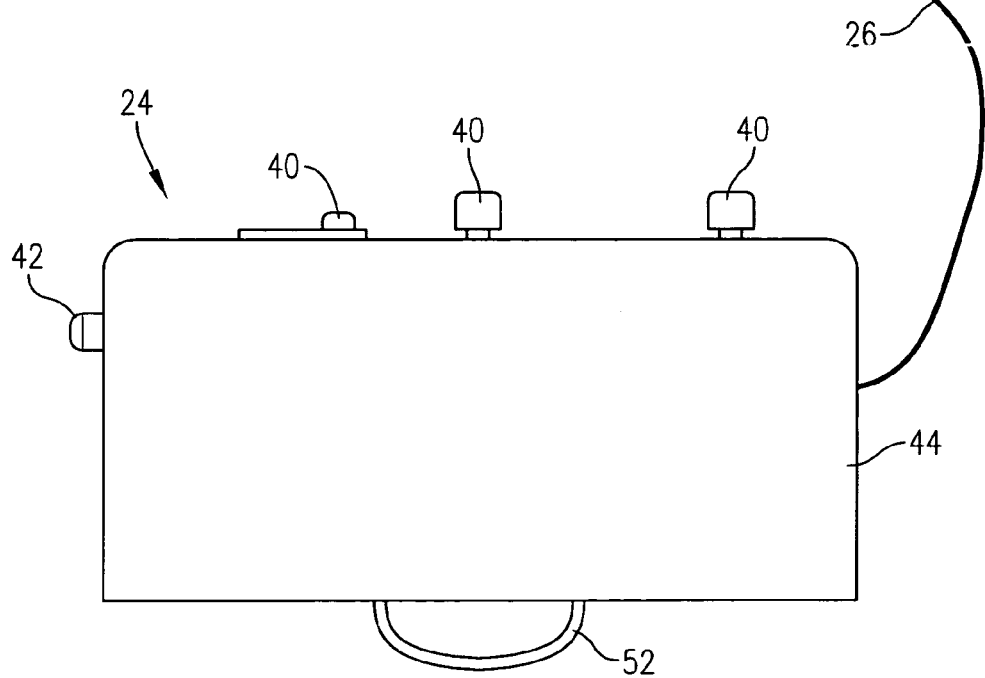
FIG. 2 is a close-up diagram of the jigging device.
Figure 5:
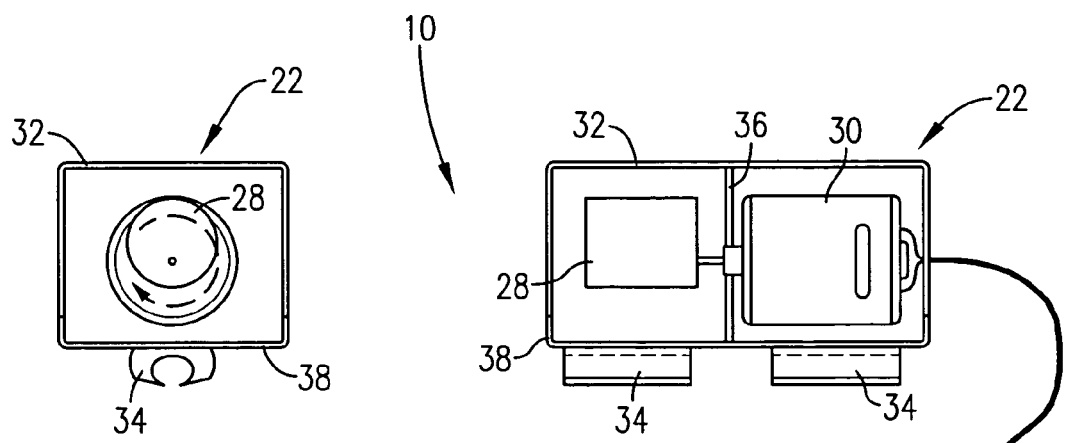
FIG. 5 is a cut-away view of FIG. 4 showing operation of one embodiment of a rotating assembly.
Figure 3:
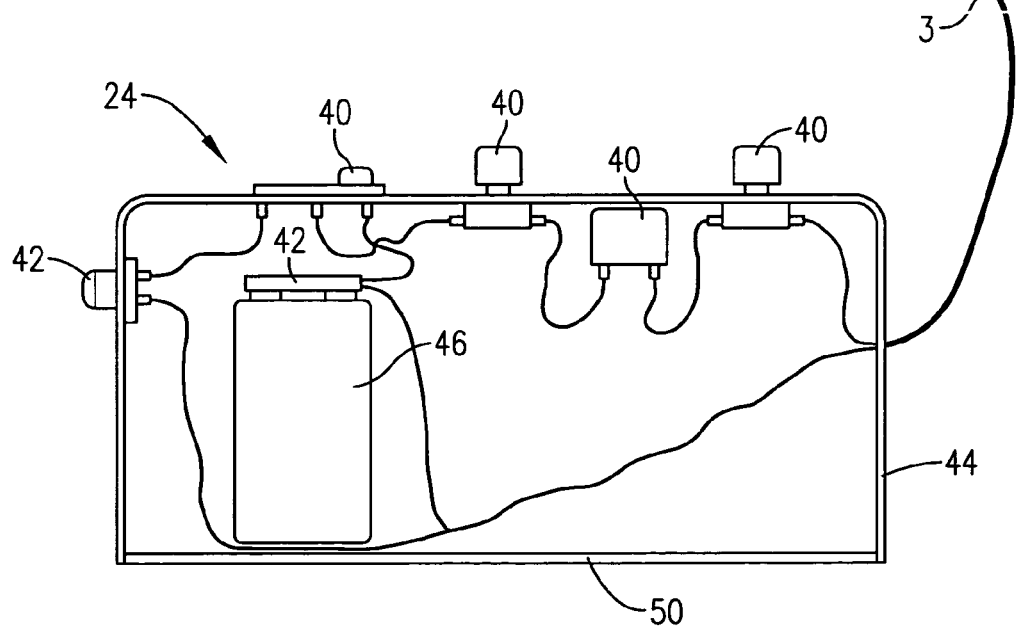
FIG. 3 is a cut-away diagram of the jigging device showing interior components of an actuator and a controller.

Referring also to FIG. 2, the jigging device 10 broadly comprises an actuator 22 attached to the rod 16, a controller 24 for controlling the actuator 22, and a cable 26 electrically coupling the actuator 22 and the controller 24. Referring also to FIGS. 3–5, the actuator 22 preferably includes a rotating assembly 28 for causing the vibration, an electric motor 30 for rotating the rotating assembly 28, a substantially waterproof housing 32 for containing the rotating assembly 28 and the motor 30, and a rod mount 34 for securing the housing 32 to the rod 16. In its simplest form, the rotating assembly 28 may be a solid homogeneous block offset from the motor's 30 shaft. In this manner, the rotating assembly's 28 center of gravity is offset, with respect to the shaft of the motor 30. As the motor 30 rotates the rotating assembly 28, by rotating the shaft, the offset center of gravity of the rotating assembly 28 causes the actuator 22 to vibrate.

Alternatively, the offset center of gravity can be achieved in other ways. For example, the rotating assembly 28 could be substantially centered on the motor's 30 shaft, but include a weight to offset its center of gravity. Furthermore, the rotating assembly 28 may simply not be homogeneous. In this case, the rotating assembly 28 may include a particularly dense or heavy portion, thereby offsetting its center of gravity.

The motor 30 is preferably rigidly secured within the housing 32. For example, the motor 30 may be secured to a bulkhead 36 within the housing 32. The bulkhead 36 may be substantially waterproof, thereby sealing a motor compartment from a rotating assembly compartment. In this case, the bulkhead 36 would ensure that the motor 30 stays dry, even if the rotating assembly compartment were to flood. Although, the bulkhead's 36 primary function is to ensure that the motor 30 is properly secured and aligned, in order to prevent the rotating assembly 28 from striking the housing 32.

The housing 32 preferably includes a removable cover 38 in order to allow access to the rotating assembly 28 and/or the motor 30. Additionally, the housing 32 preferably also includes a gasket between the housing 32 and the cover 38, in order to ensure the that the housing 32 remains impervious to water, dust, dirt, and other debris. The housing 32 must be sized and shaped to properly house both the rotating assembly 28 and the motor 30. However, the housing 32 should not be excessive in either size or shape, in order to ensure ease of use of both the jigging device 10 and the fishing pole 12. For example, in the preferred embodiment, the housing 32 is rectangular, approximately two inches wide, approximately three inches long, and approximately one and one quarter inches deep. In practice, for most fishing poles, it has been found that the housing 32 should be nor more than approximately three inches wide, approximately four inches long, or approximately two inches deep, as a larger housing is likely to interfere with operation of the fishing pole 12.

In the preferred embodiment, the rod mount 34 comprises one or more approximately three quarter inch long clips having an internal diameter of approximately three eighth inches and a lateral opening of approximately one quarter inch. While slightly modified dimensions may be used, it has been found that the clip's interior diameter should be less than one half inch. Thus, the actuator 22 may be firmly seated onto the rod 16, but not the handle 14, of the fishing pole 12. This ensures that the handle 14 will remain unobstructed, thereby not interfering with the user's operation of the fishing pole 12. This also ensures that the fishing pole 12 may be used with the conventional fishing pole holders and the jigging device 10 simultaneously.

The controller 24 preferably include one or more controls 40 to control the actuator 22, and therethrough the lure, a power input 42 through which electrical power is accepted to power the controls 40 and the motor 30, and a housing 44 through which the controls 40 may be operated. The controls 40 may include a power switch for selectively powering the motor 30, thereby activating the rotating assembly 28, an intensity control for selecting a desired magnitude or intensity of the action imparted to the lure, a delay control for selecting a delay period during which less or no action is imparted to the lure, and a duration control for selecting a duration during which action is imparted to the lure after the delay period has elapsed.

For example, the user may wish that the lure alternate between wiggling for two seconds and remaining substantially still for three seconds. In this case, the user manipulates the intensity control until he or she obtains the desired intensity of the lure's wiggling, the duration control until the lure wiggles for approximately two seconds between the delay periods, and the delay control until the lure remains substantially still for three seconds between the durations during which the lure wiggles.

Alternatively, the user may wish that the lure alternate between wiggling for one second and remaining substantially still for two seconds. In this case, the user manipulates the intensity control until he or she obtains the desired intensity of the lure's wiggling, the duration control until the lure wiggles for approximately one second between the delay periods, and the delay control until the lure remains substantially still for two seconds between the durations during which the lure wiggles.

In practice, it has been found that the duration control should allow the user to adjust the duration during which action is imparted to the lure to between one half second and five seconds. Similarly, it has been found that the delay control should allow the user to adjust the delay period during which little or no action is imparted to the lure to between one second and ten seconds. Of course, the controller 24 may not need to include all of the controls 40 discussed herein. For example, in a very basic embodiment, the controller 24 may have substantially pre-configured durations and delay periods. In this case, the user may only need to adjust the intensity control as desired.

The controls 40 may be simple switches, potentiometers, or other common electrical components. In complex embodiments, the controls 40 may interact with a computer processor in order to control the actuator 22, and therethrough the lure. Thus, the controls 40 allow the user to ensure that the lure realistically imitates live bait and/or other things that may induce a fish to strike. It should be noted that FIG. 3 shows exemplary circuitry and wiring that may be used in conjunction with the controls 40, but is in no way intended to be limiting.

The power input 42 preferably connects to a battery 46 or another similarly convenient power source. For example, the battery 46 may be a commonly available nine volt battery and may fit within the housing 44 of the controller 24. Alternatively, or additionally, the power input 42 may include a connector which penetrates the housing 44 of the controller 24. In this latter case, the battery 46 is preferably a marine battery, such as those commonly used in fishing boats, and connects to the controller 24 through a battery cable 48. Where the power input 42 allows connection of both internal and external batteries, the power switch preferably allows the user to select between the internal and external batteries.

The housing 44 may include a removable cover 50 in order to allow access to the controller's 24 internal components and/or allow the user to change the internal battery. The housing 44 may also include a belt mount 52, such as a belt loop or a belt clip, to allow the user to secure the controller 24 to his or her belt, thereby keeping the controls 40 within the user's reach.

The cable 26 may be sealed to the actuator 22 and the controller 24 using grommets, caulk, or any other commonly used sealing technique. The cable 26 may also include a quick disconnect allowing the actuator 22 to be physically and electrically separated from the controller 24. This allows the controller 24 to be used with multiple actuators, which in turn, allows the actuator 22 to be substantially permanently mounted to the fishing pole 12, if the user so desires. However, the quick disconnect is preferably waterproof, at least while the actuator 22 remains coupled with the controller 24.

It can be seen that, through construction described herein, the actuator 22 is minimized, both in terms of number of working parts and in other factors, such as size and weight. In this manner, interference with the user's operation of the fishing pole 12 is minimized. This also increases the efficiency of the jigging device 10 by minimizing the electrical power requirements of the motor 30. It can also be seen that the present invention does not directly contact the line 20, and therefore does not interfere with the user when he or she is trying to reel in the line 20.

While the present invention has been described above, it is understood that other materials and/or dimensions can be substituted. For example, the rotating assembly 28 and the motor 30 may be combined, rather than separate as described herein. These and other minor modifications are within the scope of the present invention.

In use, the user first connects the power source to the power input 42. The user then casts the lure as he or she normally would. The user then secures the actuator 24 to the rod 16. At this point, the user may operate the controls 24 and the fishing pole 12 as desired.

Having thus described a preferred embodiment of the invention, what is claimed as new and desired to be protected by Letters Patent includes the following:

1. A jigging device for imparting action to a fishing lure secured to a fishing pole having a handle and a rod extending from the handle, the device comprising:
   a rotating assembly operable to cause vibration;
   a controller operable to control the rotating assembly to cause intermittent vibration wherein the controller includes a power input operable to provide electrical power to the rotating assembly and a belt mount operable to allow a user to secure the controller to the user's belt, thereby keeping the controller within the user's reach while minimizing the housing's weight;
   a housing containing the rotating assembly; and
   a rod mount operable to secure the housing to the rod, thereby leaving the handle unobstructed and permitting the rotating assembly to impart the vibration to the rod and the action to the lure.

2. A jigging device for imparting action to a fishing lure secured to a fishing pole having a handle and a rod extending from the handle, the device comprising:
   a rotating assembly operable to cause vibration;
   a substantially waterproof housing containing the rotating assembly;
   a controller operable to control the rotating assembly and located remotely with respect to the housing, the controller including a belt mount operable to allow a user to secure the controller to the user's belt; and
   a rod mount operable to secure the housing to the rod but not the handle, thereby leaving the handle unobstructed and permitting the rotating assembly to impart the vibration to the rod and the action to the lure.

3. The device as set forth in claim 2, the controller including a power switch for selectively activating the rotating assembly and an intensity control for selecting an intensity of the action imparted to the lure.

4. The device as set forth in claim 2, the controller including a delay control for selecting a delay period during which substantially no action is imparted to the lure and a duration control for selecting a duration during which action is imparted to the lure after the delay period has elapsed.

5. The device as set forth in claim 2, wherein the controller is further operable to contain a power source capable of providing electrical power to a power input of the controller.

6. The device as set forth in claim 2, wherein the controller is further operable to contain a power input for accepting power from a power source located remotely from the controller, thereby minimizing the controller's weight.

7. A jigging device for imparting action to a fishing lure secured to a fishing pole having a handle and a rod extending from the handle, the device comprising:
   an actuator including—
      a rotating assembly operable to cause vibration and having a center of gravity,
      an electric motor operable to rotate the rotating assembly about a shaft offset from the center of gravity,
      a substantially waterproof housing containing the rotating assembly and the motor, and
      a clip having an internal diameter of less than one half inch and operable to secure the housing to the rod but not the handle, thereby leaving the handle unobstructed and permitting the rotating assembly to impart the vibration to the rod and the action to the lure;
   a controller including—
      a power switch for selectively activating the rotating assembly,
      an intensity control for selecting an intensity of the action imparted to the lure,
      a delay control for selecting a delay period during which substantially no action is imparted to the lure,
      a duration control for selecting a duration during which action is imparted to the lure after the delay period has elapsed,
      a power input operable to provide electrical power to the motor, the switch, and the controls,
      a housing through which the switch and controls may be operated, and
      a belt mount operable to allow a user to secure the controller to the user's belt,
      thereby keeping the switch and the controls within the user's reach, and
   a cable electrically coupling the actuator to the controller.

8. The device as set forth in claim 7, wherein the controller is operable to further contain a power source capable of providing electrical power to the power input.

9. The device as set forth in claim 7, wherein the power input is operable to accept power from a power source located remotely from the controller, thereby minimizing the controller's weight.

* * * * *